(12) United States Patent
Ully et al.

(10) Patent No.: US 6,669,098 B2
(45) Date of Patent: Dec. 30, 2003

(54) DATA CARRIER HAVING A CHIP INCLUDING MEANS FOR THE CONTROLLABLE VOLTAGE SUPPLY TO A FURTHER COMPONENT OF THE DATA CARRIER

(75) Inventors: Klaus Ully, Graz (AT); Peter Thueringer, Graz (AT); Peter Kompan, Graz (AT); Wolfgang Meindl, Graz (AT); Andreas Muehlberger, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 142 days.

(21) Appl. No.: 09/825,281

(22) Filed: Apr. 3, 2001

(65) Prior Publication Data

US 2001/0052798 A1 Dec. 20, 2001

(30) Foreign Application Priority Data

Apr. 4, 2000 (EP) .............................. 00890107

(51) Int. Cl.$^7$ ............................................. G06K 19/06
(52) U.S. Cl. .................. 235/492; 235/375; 235/380; 235/382; 235/382.5; 235/486
(58) Field of Search ................. 235/375, 492, 235/451, 476, 380, 382, 382.5, 486; 708/100, 250

(56) References Cited

U.S. PATENT DOCUMENTS

| | | | | |
|---|---|---|---|---|
| 5,157,247 A | * | 10/1992 | Takahira | 235/380 |
| 5,777,903 A | * | 7/1998 | Piosenka et al. | 708/100 |
| 5,825,014 A | * | 10/1998 | Sanemitsu | 235/487 |
| 5,887,176 A | * | 3/1999 | Griffith et al. | 395/750 |
| 5,889,272 A | * | 3/1999 | Lafon et al. | 235/380 |
| 6,003,777 A | * | 12/1999 | Kowalski | 235/439 |
| 6,027,029 A | * | 2/2000 | Kim | 235/492 |
| 6,164,550 A | * | 12/2000 | Pitsch | 235/438 |
| 6,202,932 B1 | * | 3/2001 | Rapeli | 235/380 |
| 6,223,990 B1 | * | 5/2001 | Kamei | 235/451 |
| 6,271,675 B1 | * | 8/2001 | Sakaki | 235/438 |
| 6,298,442 B1 | * | 10/2001 | Kocher et al. | 713/194 |
| 6,419,159 B1 | * | 7/2002 | Odinak | 235/492 |
| 6,498,404 B1 | * | 12/2002 | Thuringer et al. | 307/32 |
| 6,581,844 B2 | * | 6/2003 | Thueringer et al. | 235/492 |

FOREIGN PATENT DOCUMENTS

DE          29803987          6/1998

* cited by examiner

Primary Examiner—Michael G. Lee
Assistant Examiner—Ahshik Kim
(74) Attorney, Agent, or Firm—Aaron Waxler

(57) ABSTRACT

A data carrier (1) includes a chip (10) having a supply voltage circuit point (12), from which a supply voltage (V) can be taken, and having at least one supply voltage output (21, 22) for supplying a supply voltage (V1, V2), and having potential control means (35, 49) to which a control signal (S) can be applied and with the aid of which the supply voltage output (21, 22) can be set to different potential values in accordance with the control signal (S), and also includes at least one component (24, 29) which is spatially separated from the chip (10), which component (24, 29) has a supply voltage input (25, 30) is connected to the supply voltage output (21, 22) of the chip (10) via a connection lead (27, 32).

17 Claims, 1 Drawing Sheet

DATA CARRIER HAVING A CHIP INCLUDING MEANS FOR THE CONTROLLABLE VOLTAGE SUPPLY TO A FURTHER COMPONENT OF THE DATA CARRIER

Data carrier having a chip including means for the controllable voltage supply to a further component of the data carrier

BACKGROUND AND SUMMARY OF THE INVENTION

The invention in the first place relates to a data carrier as defined in the opening part of claim 1.

The invention in the second place relates to a chip as defined in the opening part of claim 8.

Such a data carrier and such a chip are known from the patent document U.S. Pat. No. 5,777,903 A. The known data carrier is a smart card, which is adapted to store data. The known data carrier has a chip which takes the form of a single-chip microcontroller and which includes a processor unit and additional memory means, such as a RAM, ROM and EEPROM. The chip has a supply voltage input, which is connected to a power supply and which forms the supply voltage circuit point, from which a supply voltage can be taken. The known data carrier includes two off-chip components, namely a display component and a keyboard component, which each have a separate supply voltage input connected to the output of the power supply interface. The connection between the output of the power supply interface and the supply voltage inputs of the chip and of the two further components is made with the aid of an external connection lead. Such external connection leads form a security risk because during the processing of data by means of the chip, i.e. by means of the processor unit included in the chip, current and voltage variations occur in the area of these connections, which enable an undesired access to the processed data, which is particularly critical when security-related data are processed. In this respect reference is for example made to known methods, such as a static power attack or a dynamic power attack.

It is an object of the invention to preclude the problems described hereinbefore and to provide an improved chip, so as to avoid the problems with the prior-art data carrier in a simple manner and by simple means.

According to the invention, in order to achieve the aforementioned object with a data carrier as defined in the opening part of claim 1, the characteristic features defined in the characterizing part of claim 1 are provided.

Furthermore, according to the invention, in order to achieve the aforementioned object with a chip as defined in the opening part of claim 8, the characteristic features defined in the characterizing part of claim 8 are provided.

As a result of the provision of the measures in accordance with the invention it is assured in a simple manner that the supply voltage output of the chip and, consequently, the external connection lead which is connected to this supply voltage output and which leads to the supply voltage input of a further component, can be brought at a potential value which during the processing of data with the aid of the on-chip data processing means inhibits an undesired access to the data being processed.

In a data carrier in accordance with the invention the potential control means may be formed, for example, by voltage divider means or voltage multiplier means. However, it has proved to be very advantageous when such a data carrier in addition has the characteristic features defined in claim 2. With the aid of such isolation means a particularly reliable manner of defining a desired potential value at the supply voltage output of the chip is achieved.

In a data carrier in accordance with the invention having isolation means as potential control means it has proved to be advantageous when in addition the characteristic features defined in claim 3 are provided. Thus, it is achieved in an advantageous manner that the isolation means have a highly autonomous design which does not affect the data processing. Moreover, this has the advantage that control by means of a digital signal can be effected simply and that the signal levels of the controlling digital signals and the signal levels of the signals to be controlled can be selected comparatively independently of one another.

It has proved to be very advantageous when a data carrier in accordance with as described in the preceding paragraph in addition has the characteristic features defined in claim 4, because this enables the supply voltage output of the chip to be brought simply at two fixed potential values or at a floating potential value.

The isolation switch means may utilize bipolar transistors. However, it has proved to be particularly advantageous if the isolation switch means are realized by means of field-effect transistors because this enables a power dissipation which occurs during operation of the chip to be minimized.

Furthermore, it has proved to be particularly advantageous if the potential value at the supply voltage output of the chip can be controlled by means of the field-effect transistors.

With a data carrier in accordance with the invention there are various possibilities for the generation of the control signal for the potential control means, which suitably take the form of isolation means. In this respect it has proved to be advantageous when a data carrier in accordance with the invention in addition has the characteristic features defined in claim 5, or claim 6, or claim 7, respectively. In a data carrier as defined in claim 5 the setting of the supply voltage output is simply program-controlled and is consequently highly flexible. A data carrier as defined in claim 6 advantageously guarantees that the supply voltage output of the chip is automatically set to a desired potential value during processing of data with the aid of the data processing means, which is particularly important for the processing of security-related data. A data carrier as defined in claim 7 advantageously guarantees that a desired security potential is produced at the supply voltage output of the chip when the memory means are accessed, for example to read or to write data. This is particularly important when security-related data are stored or read out.

The advantages described hereinbefore with reference to the data carriers defined in the claims 2 to 7 basically apply likewise to the chips defined in claims 9 to 14.

The above-mentioned as well as further aspects of the invention will become apparent from the embodiment described hereinafter by way of example and will be elucidated with reference to this example.

BRIEF DESCRIPTION OF THE DRAWING

The invention will now be described in more detail with reference to the drawing, which shows an embodiment which is given by way of example but to which the invention is not limited.

DESCRIPTION OF THE PREFERRED EMBODIMENT

Figure 1:
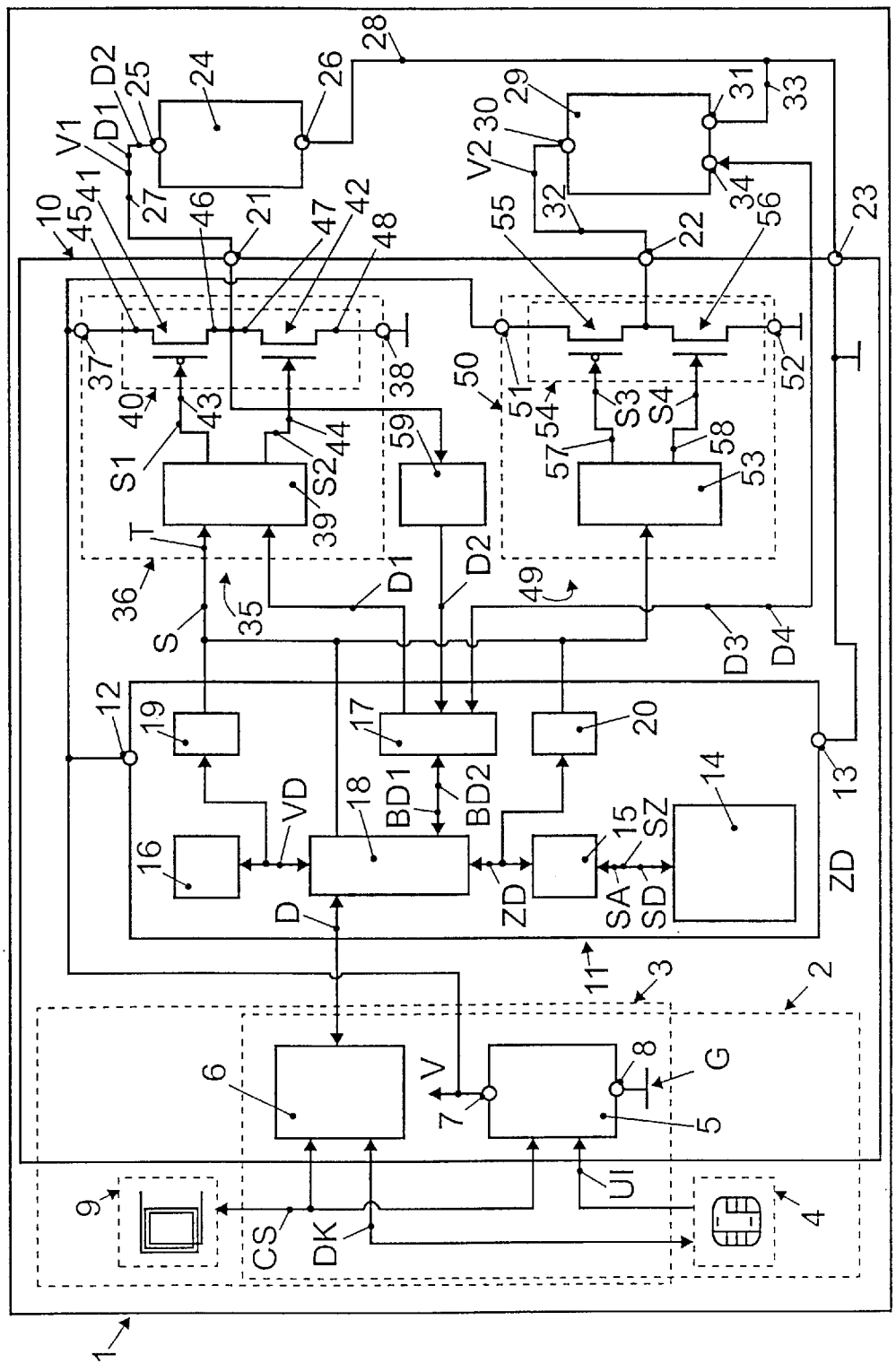
FIG. 1 is a block diagram which schematically shows a block diagram of a relevant part of a data carrier in accordance with the invention including a chip in accordance with the invention.

FIG. 1 shows a data carrier 1 adapted to provide contact-bound communication with a first communication device, not shown in FIG. 1, and contactless communication with a second communication device, neither shown in FIG. 1, and to store data. For this purpose, the data carrier 1 has a first interface 2 and a second interface 3, the first interface 2 being adapted to provide contact-bound communication with the first communication device and the second interface 3 being adapted to provide contactless communication with the second communication device.

The first interface 2 has a contact pad 4 and a supply voltage generating means 5 as well as a data conversion means 6. The contact pad 4 is adapted to establish contact with a device contact array of the first communication device during contact-bound communication, so as to enable an exchange of communication data DK between the first communication device and the data conversion means 6 of the data carrier 1. The contact pad 4 is further adapted to apply an input voltage UI from the first communication device to the supply voltage generating means 5.

The supply voltage generating means 5 are adapted to receive the input voltage UI. Furthermore, when the input voltage UI is present, the supply voltage generating means 5 are adapted to generate a supply voltage V relative to a reference potential G. The supply voltage generating means 5 have a first output 7, which serves to supply the supply voltage V, and a second output 8, from which the reference potential G can be taken. The reference potential G can also be taken from the contact pad 4.

It is to be noted here, that the supply voltage generating means 5 may also be adapted to receive an input voltage U1 supplied by a photocell, not shown in FIG. 1, or by a battery of the data carrier 1, which battery is neither shown in FIG. 1.

The data conversion means 6 are adapted to receive the communication data DK and to convert the communication data DK into data D, which data D can be processed in the data carrier 1 and can be output by the data conversion means 6.

The second interface 3 includes a coil 9 and the data conversion means 6 as well as the supply voltage generating means 5. When the data carrier 1 enters a communication range of the second communication device the coil 1 is adapted to establish an inductive coupling with a device coil of the second communication device. When this inductive coupling exists the second communication device can transfer power and data to the data carrier 1 with the aid of a carrier signal, in which case the coil 9 can supply a communication signal CS to the power supply generating means 5 and the data conversion means 6. The power supply generating means 5 are adapted to receive the communication signal CS and, when the communication signal CS is received, to generate the supply voltage V relative to the reference potential G. The data conversion means 6 are adapted to convert the communication signal CS into data D, which data D can be processed in the data carrier 1.

It is to be noted that the data conversion means 6 are also adapted to receive data D processed in the data carrier 1 and to effect a load modulation of an unmodulated communication signal CS, which has been received from the coil 9, in accordance with said data D, as a result of which the data D can be transferred from the data carrier 1 to the second communication device. Furthermore, it is to be noted that the data conversion means 6 are adapted to supply data D processed in the data carrier 1 as communication data DK, thus enabling the data D to be transferred to the first communication device with the aid of the contact pad 4. The transfer of the data D from the data carrier 1 to the communication device will not be described in any further detail because it is not relevant to the invention.

The data D to be received by the data carrier 1 include command data and useful data, which useful data may include address data and information data. The command data can be formed with the aid of access commands, processing commands, communication commands and with the aid of isolation commands.

The data carrier 1 includes a chip 10, which incorporates circuit parts of the first interface 2 and of the second interface 3, namely the power supply generating means 5 and the data conversion means 6.

The chip 10 further includes data processing means 11 adapted to receive and supply the data D and to process the data D. In the present case, the data processing means 11 are realized by means of a single-chip processor. Said data processing means 11 have a first processor supply terminal, which processor supply terminal forms a supply voltage circuit point 12 of the chip 10, at which supply voltage circuit point 12 the supply voltage V is available during operation of the chip 10. The data processing means 11 further include a second processor supply terminal 13, via which the reference potential G can be applied to the data processing means 11.

The data processing means 11 have memory means 14, formed with the aid of a RAM and a ROM and an EEPROM. The ROM is adapted to store invariable memory data SD, which invariable memory data SD represent, for example, a unique serial number for the data carrier 1 or program steps that can be executed with the aid of the single-chip processor. The RAM is adapted to store variable memory-data SD, which variable memory-data SD occur, for example, during the execution of program steps, i.e. when the supply voltage V is available at the supply voltage circuit point 12. The EEPROM is also adapted to store variable memory-data SD, which variable memory-data SD are also available when the supply voltage V is not available at the supply voltage circuit point 12.

The data processing means 11 further include access means 15, which are adapted to receive access data ZD and to access the memory means 14 in accordance with the invention the access data ZD. The access means 15 are realized by means of a memory interface of the single-chip processor. During access to the memory means 14 the access means 15 enable the memory address data SA and memory access signals SZ in accordance with the access data ZD to be generated, thus enabling various memory locations of the memory means 14, which are not shown in FIG. 1, to be addressed and thus enabling a read access or a write access to the addressed memory locations to be effected with the aid of the memory access data ZD. Thus, during a read access memory data SD to be read can be read out of the memory means 14, while during a write access memory data SD to be written can be loaded into the memory means 14.

The data processing means 11 further include a processing stage 16, which is adapted to receive processing data VD and to process the received processing data VD and, after the processing, to supply processed processing data VD. In the present case, the processing stage 16 is realized with the aid of an arithmetic-logic unit and a crypto coprocessor. With the aid of the arithmetic-logic unit the processing data VD can be processed as regards arithmetic or logic operations and with the aid of the crypto coprocessor the processing data VD can be processed as regards encrypting operations or decrypting operations.

The data processing means 11 further include component communication means 17 which are adapted to receive and to supply first component communication data BD1 and second component communication data BD2 and to supply first transmission data D1 in accordance with the first component communication data BD1 and second transmission data D3 in accordance with the second component communication data BD2 and to receive first reception data D2 and second reception data D4 and to generate the first component communication data BD1 in accordance with the first reception data D2 and to generate the second component communication data BD2 in accordance with the second reception data D4 during communication with components external to the data processing means 11. The component communication means 17 in the data processing means 11 are realized with the aid of input/output registers of the single-chip processor.

The data processing means 11 further include command execution means 18 which are adapted to receive the data D and to decode the command data D included in the data D and to execute the command data. Thus, during decoding of the access commands the access data ZD can be generated and supplied to the access means 15, after which the memory means 14 can be accessed. Moreover, during decoding of the processing commands the processing data VD can thus be generated and supplied to the processing stage 16, after which the processing data VD can be processed by means of the processor stage 16. Furthermore, during decoding of the communication commands the first component communication data or the second component communication data can thus either be generated and supplied to the component communication means 17 or be received from the component communication means. Moreover, during decoding of the isolation commands the command execution means 18 are adapted to generate and to supply a control signal.

The data processing means 11 further include processing detection means 19 adapted to detect a processing of the processing data VD in the processing stage 16. In the present case, the processing detection means 19 are adapted to detect the processing of security-related processing data VD, which security-related processing data VD occur mainly during processing of the processing data VD with the aid of the crypto coprocessor. For this purpose, the processing data VD to be supplied from the command decoding means 18 to the processing stage 16 can be applied to the processing detection means 19. In the present case, the processing detection means 19 are adapted to detect whether the processing data VD are to be processed with the aid of the crypto coprocessor. Upon a detection of processing data VD intended for the crypto coprocessor of the single-chip processor the processing detection means are adapted to generate and to supply the control signal S.

It is to be noted that the detection of the processing of security-related processing data VD can alternatively be detected by monitoring of status information with the aid of the processing detection means 19, which status information appears in the crypto coprocessor during operation of this processor.

The chip 10 further has access detection means 20, which are included in the data processing means 11 and which are adapted to detect an access to the memory means 14 and, upon detection of an access to the memory means 14, to generate the control signal S. In the present case, the access detection means 20 are adapted to receive the access data ZD and to analyze the access data ZD, the result of this analysis being that the control signal S can be generated. In this connection it is to be noted that the access detection means 20 may alternatively be adapted to detect an access to different memory locations of the memory means 14, which memory locations may store security-related memory data.

It is to be noted in this connection that the access means 15 may alternatively be adapted to generate and to supply an access indication signal, which is not shown in FIG. 1, which access indication signal can be applied to the access detection means 20 for the purpose of indicating the access to the memory means 14. The access detection means 20 may generate and supply the control signal S in response to this access indication signal.

It is to be noted further that the secondary memory means, which are not shown in FIG. 1 and which are external to the data processing means 11, may also be accommodated on the chip 10. The access detection means 20 may also detect an access to these secondary memory means.

The chip 10 further has a first supply voltage output 21 and a second supply voltage output 22 as well as a third supply voltage output 23, the supply voltage V of the chip 10 being available at the first supply voltage output 21 and at the second supply voltage output 22 and the reference potential G being available at the third supply voltage output 23.

The data carrier 1 further has a first component 24 which is spatially separated from the chip 10 and which has a first supply voltage input 25 and a second supply voltage input 26, to which first supply voltage input 25 a first component supply voltage V1 for powering the first component 24 can be applied, which first component supply voltage is defined relative to the reference potential G, which can be applied to the second supply voltage input 26. The first component 24 has its first supply voltage input 25 connected to the first supply voltage output 21 of the chip 10 via a first connection lead 27. The first component 24 has its second supply voltage input 26 connected to the third supply voltage output 23 of the chip 10 via a second connection lead 28.

The first component 24 is adapted to communicate with the component communication means 17 and during such a communication the first component communication data BD1 are transmitted, which first component communication data BD1 are formed by means of the first transmission data D1 or the first reception data D2. For the purpose of communicating the first component 24 is adapted so as to enable the first transmission data D1 to be received via the first supply voltage input 25 and so as to enable the first reception data D2 to be supplied via the first supply voltage input 25. In the present context it is to be noted that the first component 24 has supply voltage buffer means, which are not shown in FIG. 1 and with the aid of which the first component 24 can be operated briefly without the first component supply voltage V1, as is necessary during communication of the first component communication data BD1. The first component 24 takes the form of a component for the display of information in accordance with the first transmission data D1, the first reception data D2 being representative of a first component status.

The data carrier 1 has a second component 29 which is spatially separated from the chip 10 and which has a third supply voltage input 30 and a fourth supply voltage input 31, to which third supply voltage input 30 a second supply voltage V2 for the operation of the second component 29 can be applied, which second supply voltage is defined relative to the reference potential G, which can be applied to the fourth supply voltage input 31. The second component 29 has its third supply voltage input 30 connected to the second supply voltage output 22 of the chip 10 via a third connection lead 32. The second component 29 has its fourth supply voltage input 31 connected to the third supply voltage output 23 of the chip 10 via a fourth connection lead 33.

The second component 29 is adapted to communicate with the component communication means 17 and during such a communication the second component communication data BD2 are transmitted, which second component communication data BD2 are formed by means of the second transmission data D3 or the second reception data D4, which second component communication data BD2 can be transmitted to the chip 10 and can be received by the chip 10 with the aid of a communication terminal 34 of the second component 29. The second component 29 takes the form of a component for the entry of information, the second transmission data D3 serving to control the second component 29 and the second reception data D4 representing the information to be entered.

The chip 10 further has first controllable potential control means 35, to which the control signal S can be applied and which are adapted to set the first supply voltage output 21 to different potential values in accordance with the control signal S. In the present case the first potential control means 35 take the form of first isolation means 36 adapted to receive a first isolation signal T, which forms the control signal S. The first isolation means 36 have a first isolation means circuit point 37 and a second isolation means circuit point 38 as well as a first isolation means output, the first isolation means output being identical to the first supply voltage output 21 of the chip 10. The first isolation means circuit point 37 is connected to the supply voltage circuit point 12, so as to enable the supply voltage V to be applied to the first isolation means 36. The reference potential G can be applied to the first isolation means 36 via the second isolation means circuit point 38. The first isolation means 36 further include first isolation control means 39, which are adapted to receive the first isolation signal T and to receive the first transmission data D1. The first isolation control means 39 are further adapted to generate and to supply a first switching signal S1 and a second switching signal S2 in accordance with the isolation signal T and in accordance with the first transmission data D1. The first isolation means 36 include first isolation switching means 40, which are adapted to receive the first switching signal S1 and the second switching signal S2 and with the aid of which the first supply voltage output S2 can be isolated from the supply voltage circuit point 12. For this purpose, the first isolation switching means 40 include a first field-effect transistor 41 and second field-effect transistor 42, which first switching signal S1 can be applied to a control electrode 43 of the first field-effect transistor 41 and which second switching signal S2 can be applied to a control electrode 44 of the second field-effect transistor 42. The first field-effect transistor 41 has a first main electrode 45 connected to the first isolation means circuit point 37 and said field-effect transistor 41 has a second main electrode 46 connected to the first supply voltage output 21 of the chip 10. The second field-effect transistor 42 has a first main electrode 47 connected to the second main electrode 46 of the field-effect transistor 41 and said second field-effect transistor 42 has a second main electrode 48 connected to the second isolation means circuit point 38.

In accordance with the isolation signal T the first field-effect transistor 41 can be turned on and the second field-effect transistor 42 can be turned off in a first case. Thus, a first potential value can be produced at the first supply voltage output 21 and the supply voltage V available at the supply voltage circuit point 12 can then be applied to the first supply voltage input 25 of the first component 24 and consequently forms the first component supply voltage V1.

In accordance with the isolation signal T the first field-effect transistor 41 can be turned off and the second field-effect transistor in a second case. Accordingly, a second a second potential value can be produced at the first supply voltage output 21 and the reference potential G can then be applied to the first supply voltage output 25 of the first component 24.

In accordance with the first isolation signal T the first field-effect transistor 41 as well as the second field-effect transistor 42 can be turned off in a third case, as a result of which an arbitrary third potential value can be obtained at the first supply voltage output 21. The arbitrary third potential value can be determined, for example, with the aid of the first reception data D2, which can be supplied to the first supply voltage output 21 of the chip 10 by the first component 24 via its first supply voltage input 25.

The chip 10 further includes second controllable potential control means 49, to which the control signal S can be applied and which is adapted to set the second supply voltage output 22 to different potential value in accordance with the control signal S. In the present case, the second potential control means 49 take the form of second isolation means 50, which are adapted to receive the isolation signal T. The second isolation means 50 have a third isolation means circuit point 51 and a fourth isolation means circuit point 52 as well as a second isolation means output, the second isolation means output being identical to the second supply voltage output 22 of the chip 10. The third isolation means circuit point 51 is connected to the supply voltage circuit point 12, as a result of which the supply voltage V can be applied to the second isolation means 50. The reference potential G can be applied to the second isolation means 50 with the aid of the fourth isolation means circuit point 52. The second isolation means 50 further include second isolation control means 53, which are adapted to receive the isolation signal T. The second isolation control means 53 are further adapted to generate and supply a third switching signal S3 and a fourth switching signal S4 in accordance with the isolation signal T. The second isolation means 50 include second isolation switching means 54, which are adapted to receive the third switching signal S3 and the fourth switching signal S4 and by means of which the second supply voltage output 22 can be isolated from the supply voltage circuit point 12. For this purpose, the second isolation switching means 54 include a third field-effect transistor 55 and a fourth field-effect transistor 56, the third field-effect transistor 55 having a control electrode 57 to which the third switching signal S3 can be applied and the fourth field-effect transistor 56 having a control electrode 58 to which the fourth switching signal S4 can be applied. The third field-effect transistor 55 and the fourth field-effect transistor 56 are arranged relative to one another similarly to the first field-effect transistor 41 and the second field-effect transistor 42. The third field-effect transistor 55, similarly to the field-effect transistor 41, can be switched in accordance with the third switching signal S3 and the field-effect transistor 56, similarly to the second field-effect transistor 42, can be switched in accordance with the fourth switching signal S4 and similarly to the first case, the second case and the third case mentioned in relation to the first isolation means 36.

Thus, in the first case, i.e. when the third field-effect transistor 55 is turned on, the first component supply voltage V1 is formed by the supply voltage V. Accordingly, the first isolation means 36 and the second isolation means 50 are adapted to isolate the first supply voltage output 21 and the second supply voltage output 22 from the supply voltage circuit point 12 in accordance with the isolation signal T in the second case and in the third case.

The chip 10 of the data carrier 1 further includes receiving means 57, which are adapted to receive and to convert the first reception data D2 supplied by the first component 24 via the first supply voltage output 21 and to supply second reception data D2, which can be applied to the data processing means 11. In this context it is to be noted that the receiving means 57 may also be formed by parts of the first isolation means 36.

Furthermore, it is to be noted that the data carrier 1 may also include reference voltage isolation means adapted to isolate the third supply voltage output of the data carrier 1 from the reference potential G.

Moreover, it is to be noted that in the data carrier 1 the second connection lead 28 and the fourth connection lead 33 may be connected directly to the contact pad 4. In that case the third supply voltage output 23 of the chip 10 may be dispensed with.

The operation of the data carrier 1 in accordance with the invention will be explained with reference to an example of use. In this example of use the data carrier 1 is to be used as a user's electronic wallet.

For this purpose, the user first inserts the data carrier 1 into an interface of the first communication device, after which the input voltage U1 is applied to the data carrier 1 with the aid of the contact pad 4. Subsequently, the supply voltage generating means 5 generate the supply voltage V for powering the chip 10 and the first component 24 as well as the second component 29. At this instant the supply voltage V is applied to the first component 24 and to the second component 29 with the aid of the first isolation means 36 and the second isolation means 50.

In the course of a communication between the data carrier 1 and the first communication device it should first be verified whether the communication device is actually authorized to change amounts of money as represented by memory data SD stored in the memory means 14 of the data carrier 1. For this purpose, an authentication process is carried out between the data carrier 1 and the first communication device, in which access commands are used, with which access commands security-related memory data SD are accessed. In the present case, these memory data SD represent the key data required for the authentication process. The access detection means 20 detect the access to said security-related memory data SD. Upon detection the access detection means 20 generate the isolation signal T and supply it to the first isolation means 36 and the second isolation means 50. Subsequently, the first supply voltage output 21 and the second supply voltage output 22 are isolated from the supply voltage circuit point 12 with the aid of the first isolation means 36 and the second isolation means 50, as a result of which no longer any interceptable supply voltage appears on the two connection leads 27 and 32. The end of the access to the memory means 14 is also detected by the access detection means 20, upon which the supply of the isolation signal T is stopped and the first isolation means 36 and the second isolation means 50 consequently terminates the isolation of the first supply voltage output 21 and of the second supply voltage output 22 from the supply voltage V.

After the access to the key data processing commands are used by means of which useful data can be encrypted by the processing stage 16 in accordance with the key data read out of the memory means 14. The processing detection means 19 accordingly detect the processing of security-related processing data VD and consequently generate and supply the isolation signal T during the processing of the security-related processing data VD.

In the course of this communication between the data carrier 1 and the first communication device it is also possible that personal data of the user are processed by the data processing means 11 of the chip. This may, for example, involve the use of isolation commands, as a result of which the isolation signal T is generated and supplied by the command execution means 18 themselves.

For the data carrier 1 and the chip 10 for the data carrier 1 this has the advantage that an undesired access to security-related data by observation of current variations and/or voltage variations in the areas of the first connection lead 27 and the second connection lead 32 during processing of security-related data D is precluded, which security-related data D, very generally speaking, may involve the memory data SD, the processing data VD, the first component communication data BD1, the second component communication data BD2 or the useful data.

Moreover, it is achieved in an advantageous manner that in the data carrier 1 and in the chip 10 for the data carrier 1 a power consumption of the data carrier can be influenced very simply with the aid of the first isolation means 36 and the second isolation means 50, which is very advantageous for a reliable operation of the chip 10 of the data carrier 1, particularly in the case of a data carrier 11 equipped with a battery or a photocell.

What is claimed is:

1. A data carrier (1) including a chip (10) having a supply voltage generating means (5) for energizing the chip (10) through circuit point (12), from which a supply voltage (V) can be taken, and including at least one integral circuit component (24, 29) which is designed for communicating with a component communication means (17) which is spatially separated from the chip (10) and which has a supply voltage input (25, 30), to which a supply voltage (V1, V2) can be applied, characterized in that the chip (10) has a supply voltage output (21, 22), and the supply voltage input (25, 30) of the component (24, 29) is connected to the supply voltage output (21, 22) of the chip (10) via a connection lead (27, 32), and the chip (10) includes controllable potential control means (35, 49) to which a control signal (S) can be applied and with the aid of which the supply voltage output (21, 22) can be set to different potential values in accordance with the control signal (S) and in response to attempted data access by an unauthentic user such that said user cannot access data.

2. A data carrier (1) as claimed in claim 1, characterized in that the chip (10) has potential control means (35, 49) in the form of isolation means (36, 50) between the supply voltage circuit point (12) and the supply voltage output (21, 22), which isolation means are designed to receive an isolation signal (T) which forms the control signal (S) and to isolate the supply voltage output (21, 22) from the supply voltage circuit point (12) in accordance with the isolation signal (T).

3. A data carrier (1) as claimed in claim 2, characterized in that the isolation means (36, 50) include isolation switching means (40, 54), with the aid of which the supply voltage output (21, 22) can be isolated from the supply voltage circuit point (12), and the isolation means (36, 50) include isolation control means (39, 53), which are designed to control the isolation switching means (40, 54) in accordance with the isolation signal (T).

4. A data carrier (1) as claimed in claim 3, characterized in that the isolation switching means (40, 54) include a first transistor (41, 55) and a second transistor (42, 56).

5. A data carrier (1) as claimed in claim 1, characterized in that the chip (10) includes data processing means (11), and a part (18) of the data processing means (11) is designed to generate the control signal (S).

6. A data carrier (1) as claimed in claim 5, characterized in that the data processing means (11) include processing detection means (19), which are designed to detect a processing of data (VD) and which upon detection of the processing of data (VD) are designed to generate the control signal (S).

7. A data carrier (1) as claimed in claim 5, characterized in that the chip (10) includes memory means (14), and the chip (10) includes access detection means (20), which are designed to detect an access to the memory means (14) and, upon detection of an access to the memory means (14), to generate the control signal (S).

8. A chip for a data carrier (1) including at least one integral circuit component (24, 29) which is designed for communicating with a component communications means (17) and which is spatially separated from the chip (10) and which has a supply voltage input (25, 30), to which a supply voltage (V1, V2) can be applied, which chip (10) has a supply voltage circuit point (12) from which a supply voltage (V) can be taken, characterized in that the chip (10) has a supply voltage output (21, 22), end the supply voltage output (21, 22) is to be connected to the supply voltage input (25, 30) of the component (24, 29) via a connection lead (27, 32), and the chip (10) includes controllable potential control means (35, 49) to which a control signal (S) can be applied and with the aid of which the supply voltage output (21, 22) can be set to different potential values in accordance with the control signal (S) and in response to attempted data access by an unauthentic user such that said user cannot access data.

9. A chip (10) as claimed in claim 8, characterized in that the chip (10) has potential control means (35, 49) in the form of isolation means (36, 50) between the supply voltage circuit point (12) and the supply voltage output (21, 22), which isolation means are designed to receive an isolation signal (T) which forms the control signal (S) and to isolate the supply voltage output (21, 22) from the supply voltage circuit point (12) in accordance with the isolation signal (T).

10. A chip (10) as claimed in claim 9, characterized in that the isolation means (36, 50) include isolation switching means (40, 54), with the aid of which the supply voltage output (21, 22) can be isolated from the supply voltage circuit point (12), and the isolation means (36, 50) include isolation control means (39, 53), which are designed to control the isolation switching means (40, 54) in accordance with the isolation signal (T).

11. A chip (10) as claimed in claim 10, characterized in that the isolation switching means (40, 54) include a flint transistor (41, 55) and a second transistor (42, 56).

12. A chip (10) as claimed in claim 11, characterized in that the chip (10) includes data processing means (11), and a part (18) of the data processing means (11) is designed to generate the control signal (S).

13. A chip (10) as claimed in claim 12, characterized in that the data processing means (11) include processing detection means (19), which are adapted to detect a processing of data (VD) and which upon detection of the processing of data (VD) are designed to generate the control signal (S).

14. A chip (10) as claimed in claim 12, characterized in that the chip (10) includes memory means (14), and the chip (10) includes access detection means (20), which are designed to detect an access to the memory means (14) and, upon detection of an access to the memory means (14), to generate the control signal (S).

15. A method for preventing data access by an unauthentic user during the interaction between data carrier (1) and a component communication means (17), wherein:
(a) access detection means (20) detects access to security-related memory data (SD) from said communication device;
(b) upon detection, access detection means (20) generates an isolation signal (T) and supplies it to a first isolation means (36) and a second isolation means (50);
(c) a first supply voltage output (21) and a second supply voltage output (22) are isolated from supply voltage circuit point (12) by first isolation means (36) and second isolation means (50), such that no interceptable supply voltage appears on two connection leads (27, 32);
(d) upon termination of access to security-related memory data (SD) from said communication device, access detection means (20) detects said termination; and
(e) upon detection, access detection means (20) terminates generating isolation signal (T) and supplying it to first isolation means (36) and second isolation means (50), such that first supply voltage output (21) and second supply voltage output (22) are no longer isolated from, supply voltage circuit point (12).

16. The method of claim 15, wherein:
(a) processing detection means (19) detects processing of security-related processing data (VD) generates an isolation signal (T) and supplies it to first isolation means (36) and second isolation means (50);
(b) first supply voltage output (21) and second supply voltage output (22) are isolated from supply voltage circuit point (12) by first isolation means (36) and second isolation means (50), such that no interceptable supply voltage appears on two connection leads (27, 32);
(c) upon termination of access to security-related processing data (VD) from said communication device, processing detection means (19) detects said termination; and
(d) upon detection, processing detection means (19) terminates generating isolation signal (T) and supplying it to first isolation means (36) and second isolation means (50), such that first supply voltage output (21) and second supply voltage output (22) are no longer isolated from supply voltage circuit point (12).

17. The method of claim 15, wherein:
(a) access detection means (20) detects access to personal user data from said communication device;
(b) upon detection, a command isolation means (18) generates an isolation signal (T) and supplies it to a first isolation means (36) and a second isolation means (50);
(c) a first supply voltage output (21) and a second supply voltage output (22) are isolated from supply voltage circuit point (12) by first isolation means (36) and second isolation means (50), such that no interceptable supply voltage appears on two connection leads (27, 32);
(d) upon termination of access to personal user data from said communication device, access detection means (20) detects said termination; and (e) upon detection, command execution means (18) terminates generating isolation signal (T) and supplying it to first isolation means (36) and second isolation means (50), such that first supply voltage output (21) and second supply voltage output (22) are no longer isolated from supply voltage circuit point (12).

* * * * *